(12) United States Patent
White

(10) Patent No.: US 10,015,950 B1
(45) Date of Patent: Jul. 10, 2018

(54) PROTECTIVE PET LEG SLEEVES

(71) Applicant: Richard White, Largo, FL (US)

(72) Inventor: Richard White, Largo, FL (US)

( * ) Notice: Subject to any disclaimer, the term of this patent is extended or adjusted under 35 U.S.C. 154(b) by 147 days.

(21) Appl. No.: 15/270,111

(22) Filed: Sep. 20, 2016

(51) Int. Cl.
*A01K 13/00* (2006.01)
*A01K 27/00* (2006.01)

(52) U.S. Cl.
CPC .......... *A01K 13/007* (2013.01); *A01K 27/002* (2013.01); *A01K 27/005* (2013.01)

(58) Field of Classification Search
CPC .......................... A01K 13/007; A01K 27/002
USPC .......................................... 119/850, 856, 863
See application file for complete search history.

(56) References Cited

U.S. PATENT DOCUMENTS

| | | | |
|---|---|---|---|
| 3,791,383 A | 2/1974 | Friedman | |
| 4,479,457 A | 10/1984 | Rotolo | |
| 4,744,333 A * | 5/1988 | Taylor | A01K 13/007 |
| | | | 119/850 |
| 5,076,043 A | 12/1991 | Butler | |
| 5,341,765 A | 8/1994 | McComb | |
| D376,448 S | 12/1996 | Caditz | |
| 6,240,882 B1 | 6/2001 | Gross | |
| 6,564,753 B1 * | 5/2003 | Heileg | A01K 13/007 |
| | | | 119/817 |
| 7,004,114 B2 * | 2/2006 | Hippensteel | A01K 27/002 |
| | | | 119/792 |
| 7,891,322 B2 * | 2/2011 | Bennett | A01K 27/005 |
| | | | 119/856 |
| 8,393,303 B1 * | 3/2013 | Krysak | A01K 13/007 |
| | | | 119/714 |
| 8,424,495 B2 | 4/2013 | Rivera-Brutto | |
| 2003/0079695 A1 * | 5/2003 | Kerrigan | A01K 13/006 |
| | | | 119/858 |
| 2006/0054109 A1 * | 3/2006 | Smith | A01K 1/0263 |
| | | | 119/856 |
| 2008/0177210 A1 * | 7/2008 | McDevitt Larson | |
| | | | A01K 13/007 |
| | | | 602/23 |
| 2010/0242861 A1 * | 9/2010 | Arreola | A01K 27/002 |
| | | | 119/864 |
| 2011/0209673 A1 | 9/2011 | Weyerman | |
| 2013/0008393 A1 | 1/2013 | Backman | |
| 2013/0213321 A1 * | 8/2013 | Kissel, Jr. | A01K 13/007 |
| | | | 119/850 |
| 2014/0311423 A1 * | 10/2014 | Roney, III | A01K 27/002 |
| | | | 119/792 |
| 2017/0258049 A1 * | 9/2017 | Yun | A01K 27/005 |

FOREIGN PATENT DOCUMENTS

DE 102014012435 A1 2/2016

* cited by examiner

*Primary Examiner* — Son T Nguyen

(57) ABSTRACT

The protective pet leg sleeves is a harness that is used on an injured limb of an animal. The protective pet leg sleeves is a sleeve through which the injured limb of the animal is placed. The protective pet leg sleeves protects the injury as well as the associated bandages or medical devices from the natural instinct of the animal to try to remove such devices. The protective pet leg sleeves fastens to the animal such that the animal cannot remove the protective pet leg sleeves. The protective pet leg sleeves comprises a plurality of leggings and a collar tether.

1 Claim, 5 Drawing Sheets

US 10,015,950 B1

PROTECTIVE PET LEG SLEEVES

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of medical or veterinary science, more specifically, prolapsus device adapted for veterinary purposes.

SUMMARY OF INVENTION

The protective pet leg sleeves is a harness that is used on an injured limb of an animal. The protective pet leg sleeves is a sleeve through which the injured limb of the animal is placed. The protective pet leg sleeves protects the injury as well as the associated bandages or medical devices from the natural instinct of the animal to try to remove such devices. The protective pet leg sleeves fastens to the animal such that the animal cannot remove the protective pet leg sleeves.

These together with additional objects, features and advantages of the protective pet leg sleeves will be readily apparent to those of ordinary skill in the art upon reading the following detailed description of the presently preferred, but nonetheless illustrative, embodiments when taken in conjunction with the accompanying drawings.

In this respect, before explaining the current embodiments of the protective pet leg sleeves in detail, it is to be understood that the protective pet leg sleeves is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the protective pet leg sleeves.

It is therefore important that the claims be regarded as including such equivalent construction insofar as they do not depart from the spirit and scope of the protective pet leg sleeves. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
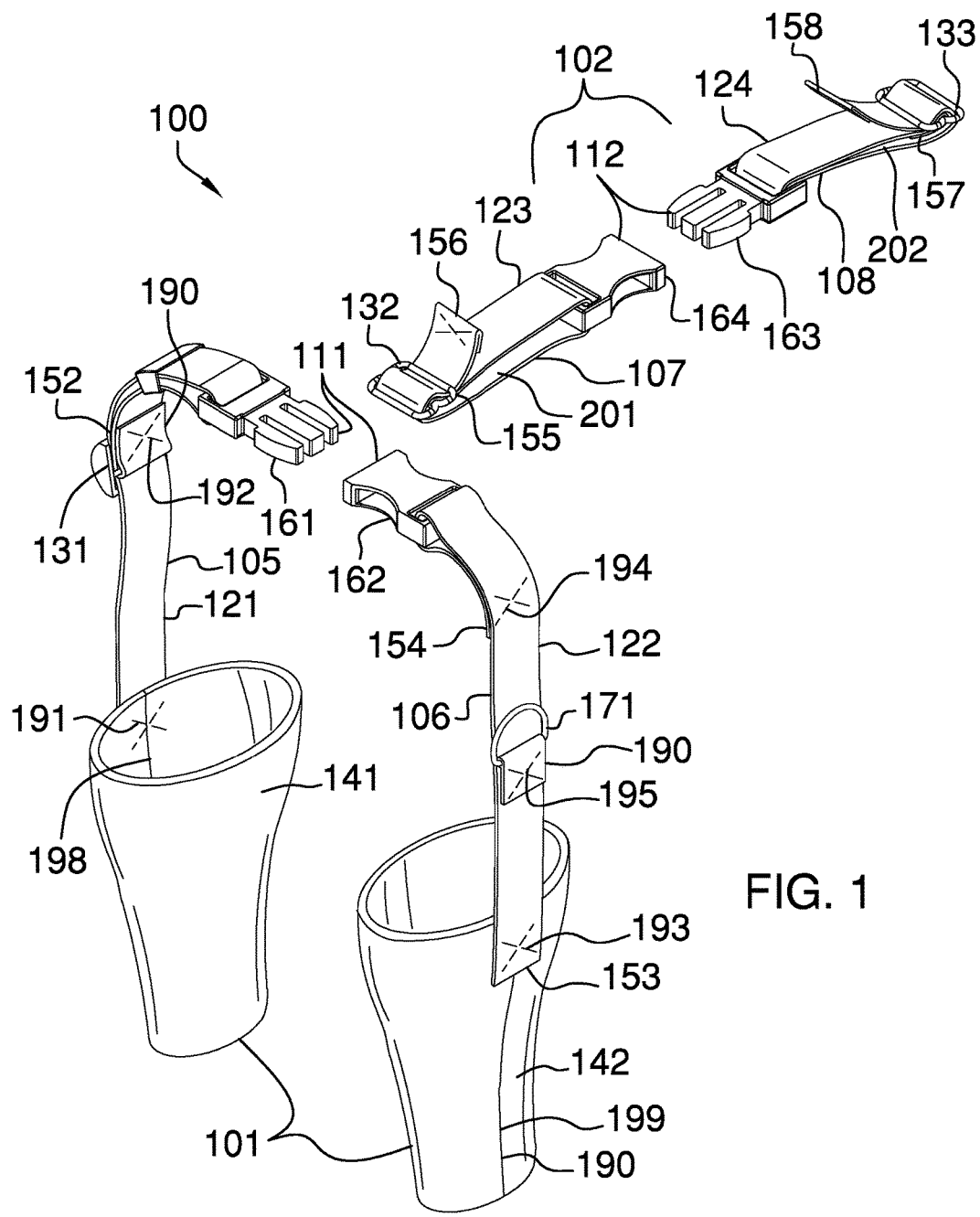
FIG. 1 is a perspective view of an embodiment of the disclosure.
Figure 2:
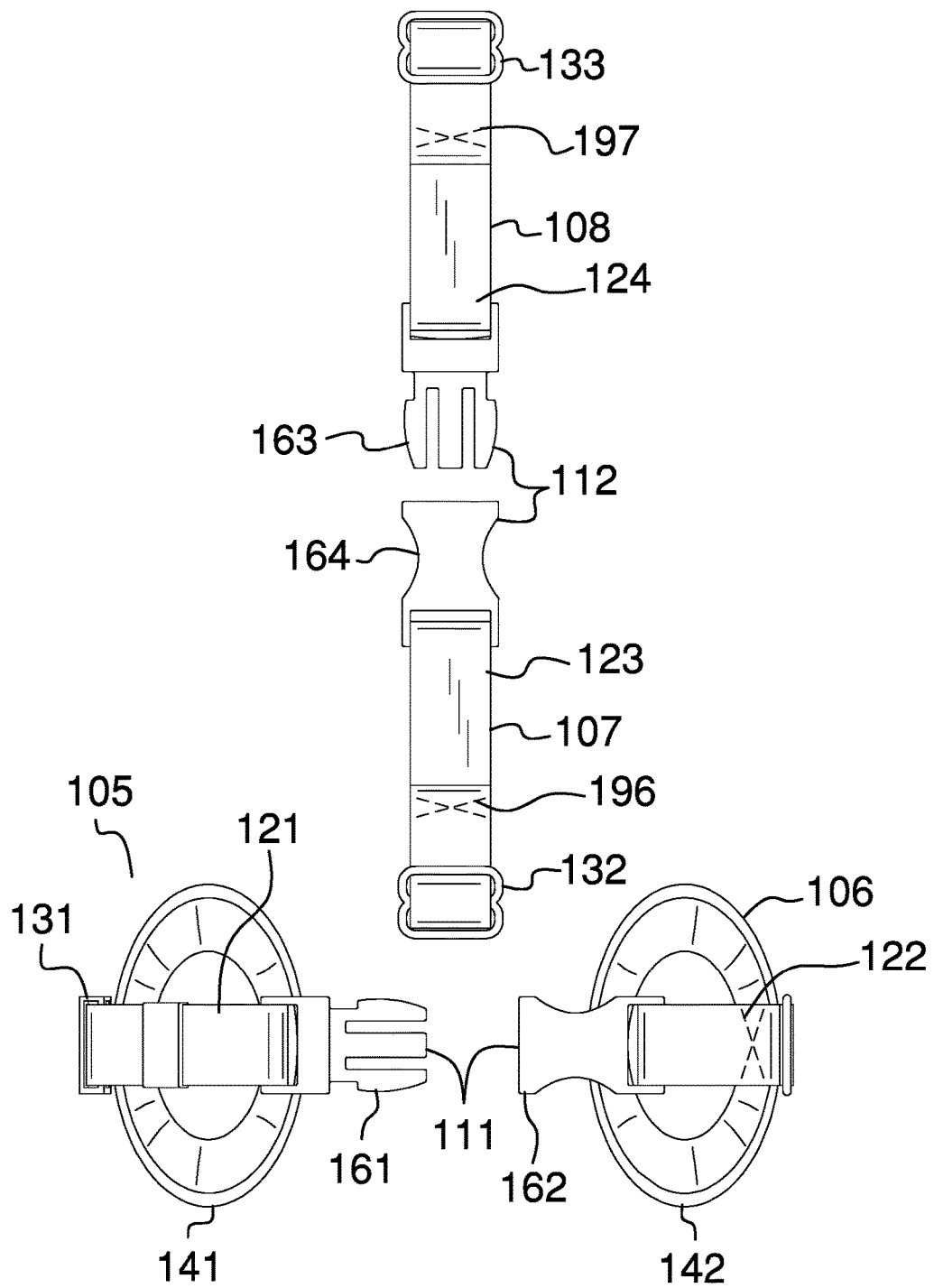
FIG. 2 is a top view of an embodiment of the disclosure.
Figure 3:
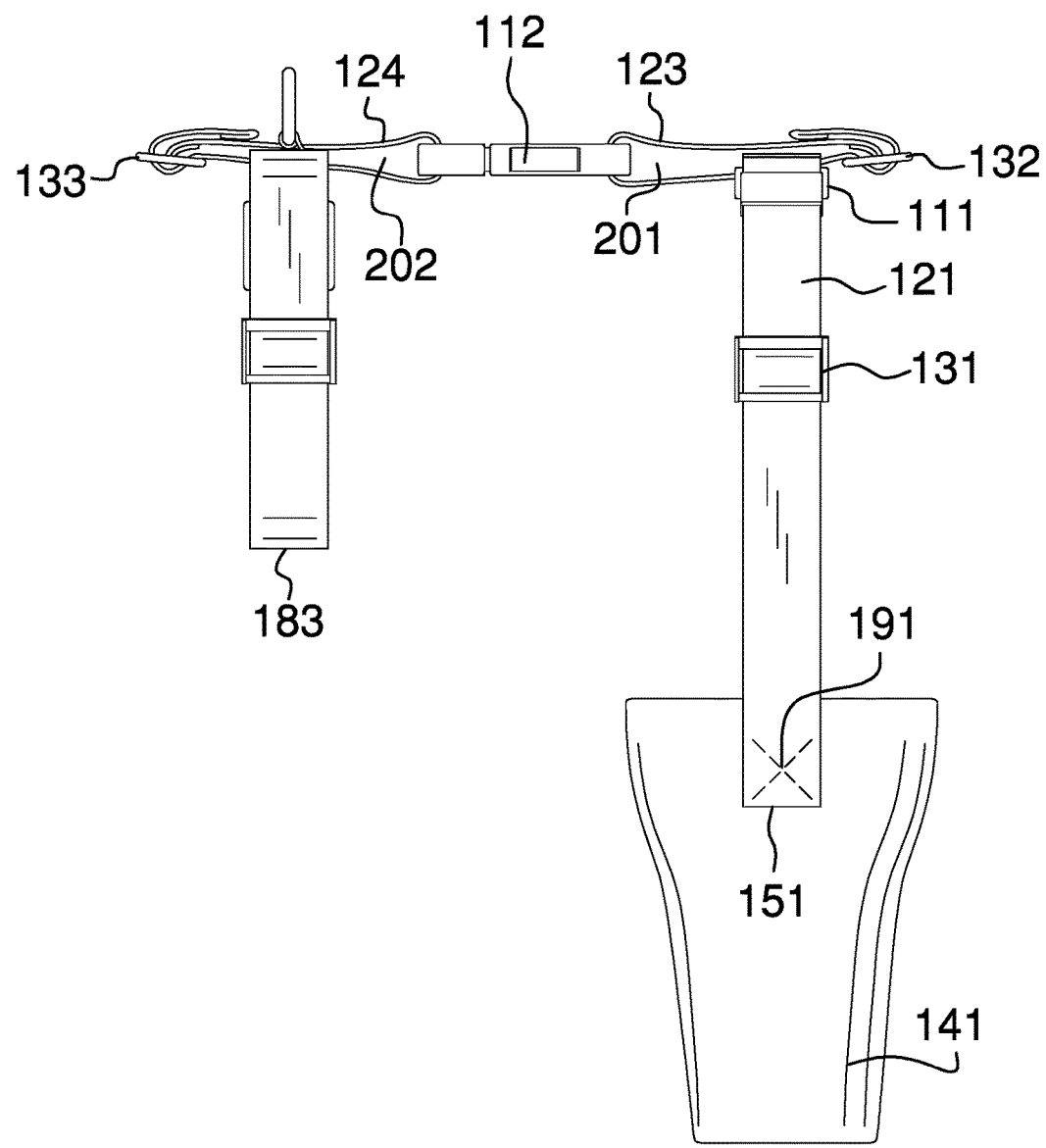
FIG. 3 is a side view of an embodiment of the disclosure.
Figure 4:
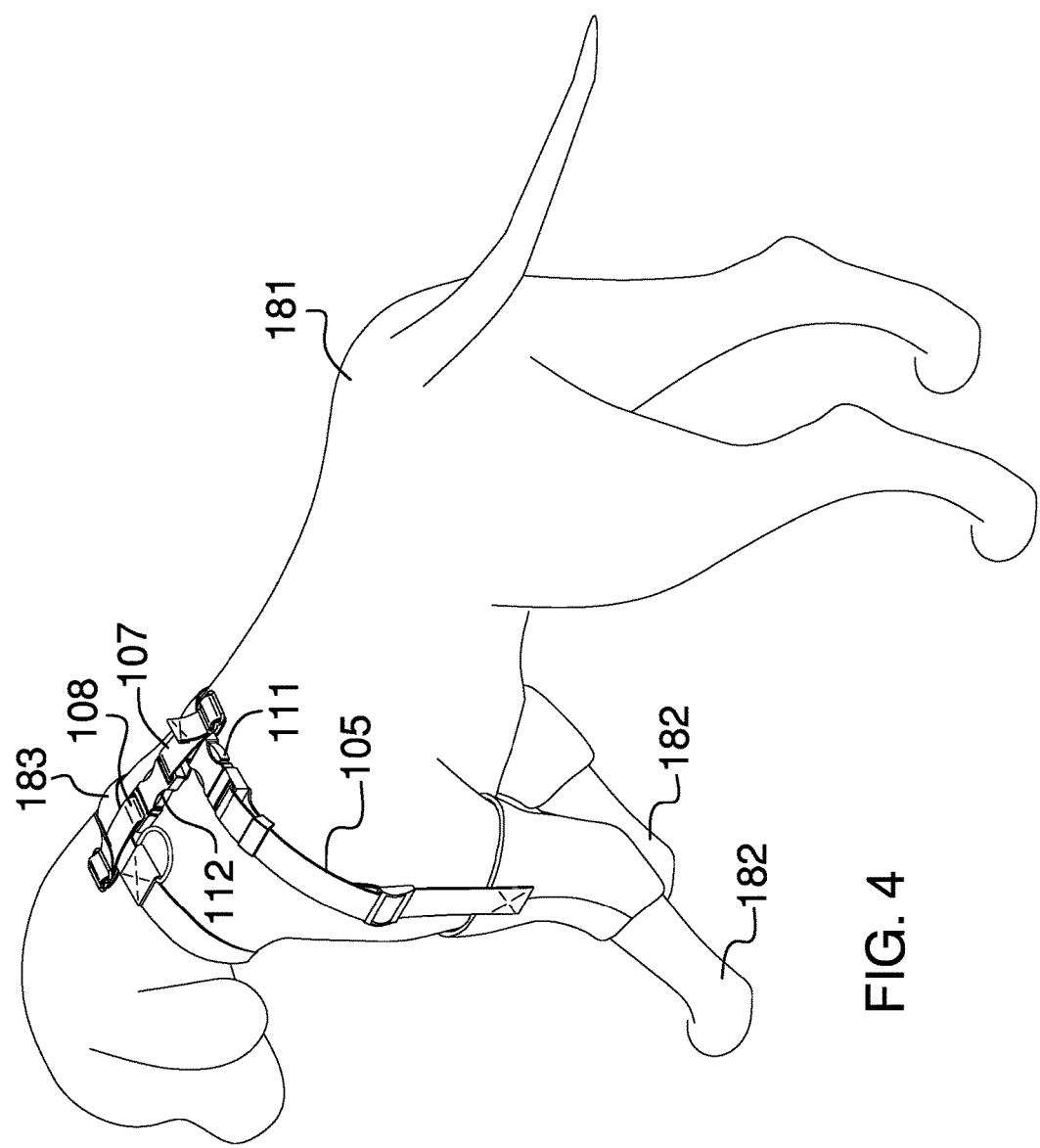
FIG. 4 is an in use view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The protective pet leg sleeves 100 (hereinafter invention) comprises a plurality of leggings 101 and a collar tether 102. The plurality of leggings 101 are placed over one or more limbs 182 selected from the plurality of limbs 182 of the animal 181. The collar tether 102 attaches the plurality of leggings 101 to a collar 183 worn by the animal 181. The invention 100 is a harness that is used on an injured limb 182 of an animal 181. The invention 100 is a sleeve through which the injured limb 182 of the animal 181 is placed. The invention 100 protects the injury as well as the associated bandages or medical devices from the natural instinct of the animal 181 to try to remove such devices. The invention 100 fastens to the animal 181 such that the animal 181 cannot remove the invention 100.

The invention 100 is assembled from a first strap 121, a second strap 122, a third strap 123, a fourth strap 124, a first quick release buckle 111, a second quick release buckle 112, a first ring and slider arrangement 131, a second ring and slider arrangement 132, a third ring and slider arrangement 133, a first protective sleeve 141, a second protective sleeve 142, and a hanging ring 171. The invention 100 is assembled into a unified apparatus using a plurality of seams 190. The plurality of seams 190 comprises a first seam 191, a second seam 192, a third seam 193, a fourth seam 194, a fifth seam 195, a sixth seam 196, and a seventh seam 197.

The plurality of leggings 101 comprises a first legging 105 and a second legging 106. The first legging 105 attaches to a first limb 182 selected from the plurality of limbs 182 of the animal 181. The second legging 106 attaches to a second limb 182 selected from the plurality of limbs 182 of the animal 181. The first quick release buckle 111 attaches the first legging 105 to the second legging 106. The collar tether 102 comprises a legging loop 107 and a collar loop 108. The legging loop 107 forms a first loop 201 through which first quick release buckle 111 is inserted such that the plurality of leggings 101 are attached to the collar tether 102. The collar loop 108 forms a second loop 202 through which the collar 183 of the animal 181 is inserted such that the collar 183 is attached to the invention 100.

The first quick release buckle 111 comprises a first male connector 161 and a first female connector 162. The second quick release buckle 112 comprises a second male connector 163 and a second female connector 164.

The first legging 105 comprises the first protective sleeve 141, the first strap 121, the first male connector 161, and the first ring and slider arrangement 131. The first strap 121 is a webbing that is further defined with a first end 151 and a second end 152. The first protective sleeve 141 is a sheeting material that is formed into a tubular structure such that a limb 182 selected from the plurality of limbs 182 of the animal can be inserted into the first protective sleeve 141. The first protective sleeve 141 is discussed in more detail elsewhere in this disclosure. The first seam 191 attaches the first end 151 of the first strap 121 to the first protective sleeve 141. The second end 152 of the first strap 121 is threaded through the first male connector 161 and the first ring and slider arrangement 131. As shown most clearly in FIG. 1, the second seam 192 attaches the second end 152 of the first strap 121 to the face of the first strap 121 such that the first male connector 161 and the first ring and slider arrangement 131 are securely attached to the first strap 121. Methods to attach quick release buckles and ring and slider arrangements to webbings are well known and documented in the textile arts and the apparel arts.

The second legging 106 comprises the second protective sleeve 142, the second strap 122, the first female connector 162, and the hanging ring 171. The second strap 122 is a webbing that is further defined with a third end 153 and a fourth end 154. The second protective sleeve 142 is a sheeting material that is formed into a tubular structure such that a limb 182 selected from the plurality of limbs 182 of the animal 181 can be inserted into the second protective sleeve 142. The second protective sleeve 142 is discussed in more detail elsewhere in this disclosure. The third seam 193 attaches the third end 153 of the second strap 122 to the second protective sleeve 142. The fourth end 154 of the second strap 122 is threaded through the first female connector 162. As shown most clearly in FIG. 1, the fourth seam 194 attaches the fourth end 154 of the second strap 122 to the face of the second strap 122 such that the first female connector 162 securely attaches to the second strap 122. The hanging ring 171 is a structural ring that is attached to the second strap 122 such that the invention 100 can be hung from a hook. As shown in FIG. 1, the hanging ring 171 is attached to the second strap 122 using the fifth seam 195. Methods to attach quick release buckles, ring and slider arrangements, and hanging rings to webbings are well known and documented in the textile arts and the apparel arts.

The legging loop 107 comprises the third strap 123, the second female connector 164, and the second ring and slider arrangement 132. The third strap 123 is a webbing that is further defined with a fifth end 155 and a sixth end 156. As shown most clearly in FIG. 1, the fifth end 155 of the third strap 123 is threaded through the second female connector 164 and is attached to the second ring and slider arrangement 132 with the sixth seam 196. The sixth end 156 of the third strap 123 is threaded through the second ring and slider arrangement 132 such that the span of the length of the legging loop 107 can be adjusted to accommodate the size of the animal 181. Methods to attach quick release buckles and ring and slider arrangements to webbings are well known and documented in the textile arts and the apparel arts.

The collar loop 108 comprises the fourth strap 124, the second male connector 163, and the third ring and slider arrangement 133. The fourth strap 124 is a webbing that is further defined with a seventh end 157 and an eighth end 158. As shown most clearly in FIG. 1, the seventh end 157 of the fourth strap 124 is threaded through the second male connector 163 and is attached to the third ring and slider arrangement 133 with the seventh seam 197. The eighth end 158 of the fourth strap 124 is threaded through the third ring and slider arrangement 133 such that the span of the length of the collar loop 108 can be adjusted to accommodate the size of the animal 181. Methods to attach quick release buckles and ring and slider arrangements to webbings are well known and documented in the textile arts and the apparel arts.

In the first potential embodiment of the disclosure, the first protective sleeve 141 is formed from a commercially available tubular textile. The second protective sleeve 142 is formed from is formed from a commercially available tubular textile.

In a second potential embodiment of the disclosure, the first protective sleeve 141 is formed from a commercially available elastic tubular textile. The second protective sleeve 142 is formed from is formed from a commercially available elastic tubular textile.

In a third potential embodiment of the disclosure, the plurality of seams further comprises an eighth seam 198 and a ninth seam 199. The first protective sleeve 141 is formed from a textile and the second protective sleeve 142 is formed from a textile material. The first protective sleeve 141 is a sheeting material that is formed into a tubular structure using an eighth seam 198. The second protective sleeve 142 is a sheeting material that is formed into a tubular structure using the ninth seam 199.

In a fourth potential embodiment of the disclosure, the first protective sleeve 141 is formed from an elastic textile in the same manner as the third potential embodiment of the disclosure. The second protective sleeve 142 is formed from an elastic textile material in the same manner as the first potential embodiment of the disclosure. The use of elastic textiles allows for compression to be applied to the injured limb 182 of the animal 181.

Figure 5:
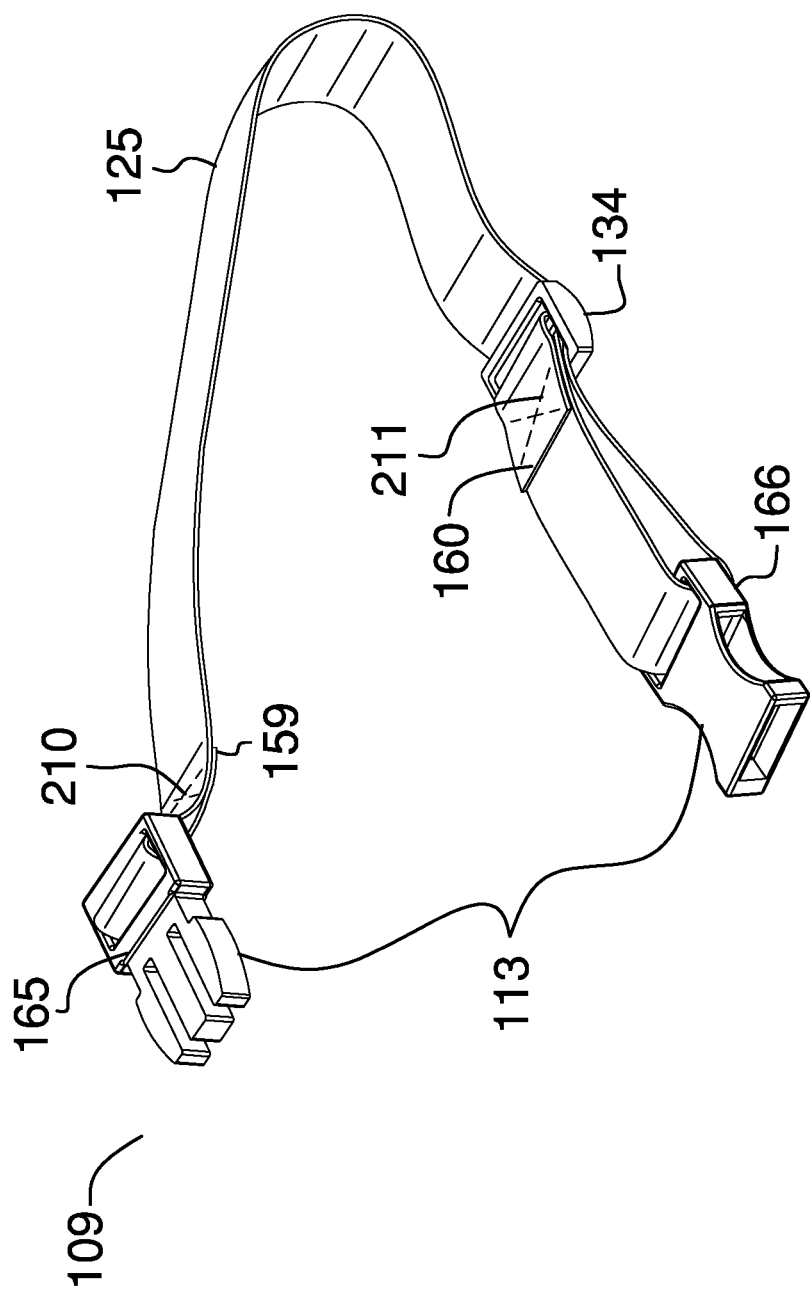
FIG. 5 is a detail view of an embodiment of the disclosure.

In a fifth potential embodiment of the disclosure, the span of the legging loop 107 and the collar loop 108 is extended through the use of an extender 109. The plurality of seams 190 further comprises a tenth seam 210 and an eleventh seam 211. The extender 109 comprises a fifth strap 125, a fourth ring and slider arrangement 134, and a third quick release buckle 113. The third quick release buckle 113 further comprises a third male connector 165 and a third female connector 166. The fifth strap 125 further comprises a ninth end 159 and a tenth end 160. As shown in FIG. 5, the ninth end 159 is threaded through fifth male connector 165 and attaches to the face of the fifth strap 125 using the tenth seam 210. The tenth end 160 is threaded through the fourth ring and slider arrangement 134 and the third female connector 166. The tenth end 160 attaches to the face of the fifth strap 125 using the eleventh seam 211.

Each of the plurality of seams 190 is a sewn seam. The components described within this disclosure are commercially available and well known within the textile and apparel arts.

To use the invention 100: 1) a first limb 182 of the animal 181 is inserted through the first protective sleeve 141; 2) the second limb 182 of the animal 181 is inserted through the second protective sleeve 142; the first male connector 161 is inserted through the first loop 201 formed by the legging loop 107 and attached to the first female connector 162 to form the first quick release buckle 111; 3) the collar 183 of the animal 181 is inserted through the second loop 202 formed by the collar loop 108 and attached around the neck of the animal 181; 4) the second male connector 163 is inserted into the second female connector 164 to form the second quick release buckle 112; and, 5) the first ring and slider arrangement 131, the second ring and slider arrangement 132, and the third ring and slider arrangement 133 are adjusted to fit the animal 181. To use the extender 109, the third male component 165 is inserted into the second female component 164 and the second male component 163 is inserted into the third female component 166.

The following definitions were used in this disclosure:

Buckle: As used in this disclosure, a buckle is a fastening that is used for joining a first loose end of a strap to a second loose end of the same strap or a different strap. A buckle further comprises a male connector that is attached to a first loose end and a female connector that is attached to a second loose end. The male connector has a pin or other structure that is generally caught by a structure formed in the female connector.

Elastic: As used in this disclosure, an elastic is a material or object that deforms when a force is applied to it and that is able to return to its original shape after the force is removed. A material that exhibits these qualities is also referred to as an elastomeric material.

Elastic Textile: As used in this disclosure, an elastic textile is a textile that contains elastic yarns as some of the yarns that make up the textile. An elastic textile is constructed such that the elastic textile will stretch when a force is applied and will return to its original shape when after the force is removed.

Elastic Yarn: As used in this disclosure, an elastic yarn is a yarn formed from elastomeric materials.

Fastener: As used in this disclosure, a fastener is a device that is used to join or affix two objects. Fasteners generally comprise a first element which is attached to the first object and a second element which is attached to the second object such that the first element and the second element join to affix the first object and the second object.

Harness: As used in this disclosure, a harness is an apparatus comprising a plurality of straps and one or more fasteners that is used to anchor a first person or first object to a second object.

Loop: As used in this disclosure, a loop is the length of a first linear structure including, but not limited to, lines, cords, or ribbons, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Quick Release Buckle: As used in this disclosure, a quick release buckle is a specific type of buckle wherein the buckle can be readily and easily disconnected by pressing a button or pinching one of the ends of the quick release buckle. Quick release buckles are readily and commercially available.

Ring: As used in this disclosure, a ring is term that is used to describe a flat or plate like structure through which an aperture is formed.

Ring and Slider Arrangement: As used in this disclosure, a ring and slider arrangement is an apparatus comprising a ring component and a slider component that is used to adjust the effective length of a webbing in an application. In the ring and slider arrangement, an end of the webbing is inserted through the slider component, looped through the ring component and then reverse threaded through the slider component for a second time. By adjusting the position of the slider component relative to the webbing, the effective length of the webbing can be adjusted. Ring and slider arrangements are well known and documented in the textile arts.

Seam: As used in this disclosure, a seam is a joining of: 1) a first textile to a second textile; 2) a first sheeting to a second sheeting; or, 3) a first textile to a first sheeting. Potential methods to form seams include, but are not limited to, a sewn seam, a heat bonded seam, or an ultrasonically bonded seam.

Sewn Seam: As used in this disclosure, a sewn seam a method of attaching two or more layers of textile, leather, or other material through the use of a thread, a yarn, or a cord that is repeatedly inserted and looped through the two or more layers of textile, leather, or other material.

Sheath: As used in this disclosure, a sheath is a flexible material that is used to cover an object.

Sheeting: As used in this disclosure, sheeting is a material, such as a textile, a plastic, or a metal foil, in the form of a thin flexible layer or layers.

Sleeve: As used in this disclosure, a sleeve is an encasement into or through which a limb or an object is inserted.

Strap: As used in this disclosure a strap is a strip of leather, cloth, or other flexible material, often with a buckle, that is used to fasten, secure, carry, or hold onto something.

Strip: As used in this disclosure, the term describes a long and narrow object of uniform thickness that appears thin relative to the length of the object. Strips are often rectangular in shape.

Textile: As used in this disclosure, a textile is a material that is woven, knitted, braided or felted. Synonyms in common usage for this definition include fabric and cloth.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A harness comprising: a plurality of leggings and a collar tether; wherein the plurality of leggings are configured to be placed over one or more limbs selected from the plurality of limbs of an animal; wherein the collar tether attaches the plurality of leggings to a collar configured to be worn by the animal; wherein the harness is configured to be used on an injured limb of an animal; wherein the harness is a sleeve configured to be placed on the injured limb of the animal; wherein the harness configured to fasten to the animal such that the animal cannot remove the harness; wherein the harness is assembled from a first strap, a second strap, a third strap, a fourth strap, a first quick release buckle, a second quick release buckle, a first ring and slider arrangement, a second ring and slider arrangement, a third ring and slider arrangement, a first protective sleeve, a second protective sleeve, and a hanging ring; wherein the harness is assembled into a unified apparatus using a plurality of seams; wherein the plurality of seams comprises a first seam, a second seam, a third seam, a fourth seam, a fifth seam, a sixth seam, and a seventh seam; wherein the plurality of leggings comprises a first legging and a second legging; wherein the first legging configured to be attached to a first limb selected from the plurality of limbs of the animal; wherein the second legging configured to be attached to a second limb selected from the plurality of limbs of the animal; wherein the first quick release buckle attaches the first legging to the second legging; wherein the collar tether comprises a legging loop and a collar loop; wherein the legging loop forms a first loop through which the first quick release buckle is inserted such that the plurality of leggings are attached to the collar tether; wherein the collar loop forms a second loop through which the collar of the animal is inserted such that the collar is attached to the harness; wherein the first quick release buckle comprises a first male connector and a first female connector; wherein the second quick release buckle comprises a second male connector and a second female connector; wherein the first legging comprises the first protective sleeve, the first strap, the first male connector, and the first ring and slider arrangement; wherein the first strap is a webbing that is further defined with a first end and a second end; wherein the first protective sleeve is a tubular structure wherein the first seam attaches the first end of the first strap to the first protective sleeve; wherein the second end of the first strap is threaded through the first male connector and the first ring and slider arrangement; wherein the second seam attaches the second end of the first strap to the face of the first strap; wherein the second legging comprises the second protective sleeve, the second strap, the first female connector, and the hanging ring; wherein the second strap is a webbing that is further defined with a third end and a fourth end; wherein the second protective sleeve is a tubular structure; wherein the third seam attaches the third end of the second strap to the second protective sleeve; wherein the fourth end of the second strap is threaded through the first female connector; wherein the fourth seam attaches the fourth end of the second strap to the face of the second strap such that the first female connector securely attaches to the second strap; wherein the second legging further comprises the hanging ring; wherein the hanging ring is a structural ring that is attached to the second strap using the fifth seam; wherein the legging loop comprises the third strap, the second female connector, and the second ring and slider arrangement; wherein the third strap is a webbing that is further defined with a fifth end and a sixth end; wherein the fifth end of the third strap is threaded through the second female connector and is attached to the second ring and slider arrangement with the sixth seam; wherein the collar loop comprises the fourth strap, the second male connector, and the third ring and slider arrangement; wherein the fourth strap is a webbing that is further defined with a seventh end and an eighth end; wherein the seventh end of the fourth strap is threaded through the second male connector and is attached to the third ring and slider arrangement with the seventh seam; wherein the eighth end of the fourth strap is threaded through the third ring and slider arrangement; wherein the first male connector is inserted through the first loop formed by the legging loop and attaches to the first female connector to form the first quick release buckle; wherein the collar of the animal is inserted through the second loop formed by the collar loop and configured to be attached around the neck of the animal; wherein the second male connector is inserted into the second female connector to form the second quick release buckle; wherein each of the plurality of seams is a sewn seam; wherein the first protective sleeve is formed from a first tubular textile; wherein the second protective sleeve is formed from is formed from a second tubular textile; wherein the first protective sleeve is formed from a first elastic tubular textile; wherein the second protective sleeve is formed from is formed from a second elastic tubular textile; wherein the plurality of seams further comprises an eighth seam and a ninth seam; wherein the first protective sleeve is formed from a first textile material; wherein the second protective sleeve is formed from a second textile material; wherein the first protective sleeve is formed into a tubular structure using an eighth seam; wherein the second protective sleeve is formed into a tubular structure using the ninth seam; wherein the first textile material is an elastic textile material; wherein the second textile material is an elastic textile material; wherein the harness further comprises an extender; wherein the extender expands the span of the legging loop and the collar loop; wherein the plurality of seams further comprises a tenth seam and an eleventh seam; wherein the extender comprises a fifth strap, a fourth ring and slider arrangement, and a third quick release buckle; wherein the third quick release buckle further comprises a third male connector and a third female connector; wherein the fifth strap further comprises a ninth end and a tenth end; wherein the ninth end is threaded through fifth male connector; wherein the ninth end attaches to the face of the fifth strap using the tenth seam; wherein the tenth end is threaded through the fourth ring and slider arrangement and the third female connector; wherein the tenth end attaches to the face of the fifth strap using the eleventh seam; wherein each of the plurality of seams is a sewn seam; wherein the first protective sleeve is formed from a first tubular textile; wherein the second protective sleeve is formed from is formed from a second tubular textile; wherein each of the plurality of seams is a sewn seam; wherein the first protective sleeve is formed from a first elastic tubular textile; wherein the second protective sleeve is formed from is formed from a second elastic tubular textile; wherein the plurality of seams further comprises an eighth seam and a ninth seam; wherein each of the plurality of seams is a sewn seam; wherein the first protective sleeve is formed from a first textile material; wherein the second protective sleeve is formed from a second textile material; wherein the first protective sleeve is formed into a tubular structure using an eighth seam; wherein the second protective sleeve is formed into a tubular structure using the ninth seam; wherein the first textile material is an elastic textile material; wherein the second textile material is an elastic textile material.

* * * * *